025B

United States Patent
Rock et al.

(10) Patent No.: US 7,770,764 B2
(45) Date of Patent: Aug. 10, 2010

(54) SPARE TIRE UNDERCOVER

(75) Inventors: Yaniv Rock, San Francisco, CA (US); Brian Dressel, Dublin, OH (US); Robb Augustine, Dublin, OH (US); Matthew Wolfe, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1155 days.

(21) Appl. No.: 11/279,408

(22) Filed: Apr. 12, 2006

(65) Prior Publication Data

US 2007/0241144 A1    Oct. 18, 2007

(51) Int. Cl.
*B62D 43/00* (2006.01)
*B62D 43/02* (2006.01)
*B62D 43/04* (2006.01)

(52) U.S. Cl. ............... 224/42.23; 224/42.12; 224/42.24; 224/42.26; 224/42.27; 224/547; 224/552

(58) Field of Classification Search .............. 224/42.12, 224/42.13, 42.14, 42.19, 42.2, 42.21, 42.23, 224/42.24, 42.26, 42.27, 42.29, 42.3, 547, 224/552; 296/37.2; 414/463; 206/304, 304.2
See application file for complete search history.

(56) References Cited

U.S. PATENT DOCUMENTS

| | | | | |
|---|---|---|---|---|
| 3,593,898 A | * | 7/1971 | Diforte | ............... 224/315 |
| 4,188,178 A | * | 2/1980 | Anscher | ............... 425/469 |
| 4,423,900 A | * | 1/1984 | Sugimoto et al. | ....... 296/37.14 |
| 4,738,382 A | * | 4/1988 | Natori | ............... 224/42.24 |
| 5,669,534 A | | 9/1997 | Edgerley | |
| 5,823,413 A | | 10/1998 | Seltz | |
| 6,102,464 A | * | 8/2000 | Schneider et al. | .......... 296/37.3 |
| 6,290,278 B1 | * | 9/2001 | Loveland | ............... 296/39.1 |
| 6,336,671 B1 | | 1/2002 | Leonardi | |
| 6,389,670 B2 | * | 5/2002 | Morin et al. | ............. 29/401.1 |
| 6,796,466 B2 | * | 9/2004 | Essig | ............... 224/42.21 |

FOREIGN PATENT DOCUMENTS

| | | | |
|---|---|---|---|
| JP | 09095266 A | * | 4/1997 |
| JP | 10071971 | | 3/1998 |
| JP | 11129944 A | * | 5/1999 |
| JP | 2003335271 A | * | 11/2003 |

* cited by examiner

*Primary Examiner*—Nathan J Newhouse
*Assistant Examiner*—Adam Waggenspack
(74) *Attorney, Agent, or Firm*—Mark E. Duell; Rankin, Hill & Clark LLP

(57) ABSTRACT

An aerodynamic spare tire cover system is provided for use with a spare tire stored on a vehicle underbody. The cover system can be used to cover a full sized spare tire or a temporary spare tire, while providing the same aerodynamic qualities. The cover system includes an annular spare tire cover defining a central aperture, a removable center cap for selectively covering the central aperture, a center spacer supported by the annular spare tire cover that is adjustable between a first position and a second position depending on whether a full sized spare or temporary spare is being covered, and removable spacers supported by the annular spare tire cover. A full sized spare tire and the center spacer in the first position space the spare tire cover the same distance from a position on the vehicle underbody, on the opposite side of the spare tire, as a temporary spare tire, and the center spacer in the second position.

15 Claims, 6 Drawing Sheets

SPARE TIRE UNDERCOVER

BACKGROUND OF THE INVENTION

Maximizing fuel efficiency in modern vehicle design is a prime concern of engineers. One area that contributes to fuel efficiency of a vehicle is vehicle aerodynamics. The pattern of air movement over a vehicle has been closely scrutinized over time and is well understood. More recently, the flow of air beneath a vehicle has also been closely scrutinized. In one aspect of vehicle underbody design, when more surfaces can be made consistently smooth, underbody aerodynamics is improved.

For years, tractor trailer vehicles and heavy duty pick-up trucks have stored spare tires (including a wheel rim) on the vehicle underbody. This type of spare tire storage is becoming more prevalent on passenger vehicles as well because more interior space can be reserved for storage of personal items or cargo.

There is a continuing debate over the desirability of using, in passenger vehicles, a full sized spare tire as compared to a smaller temporary spare tire. On one hand, the full sized spare tire can be switched with a damaged tire and used indefinitely while providing the same performance characteristics as the remaining three tires. On the other hand, use of a temporary spare, when in storage, takes up a small amount of storage room and is light, thus, increasing the vehicle's overall fuel efficiency. Each spare tire type lacks the advantages of the other type.

When a spare tire is secured to a vehicle underbody, either type of spare tire can be held by a known hoist or clamping system. However, what is desired is a way of providing a consistent smooth air flow surface on the underside of the vehicle, no matter which type of spare tire is used so superior vehicle aerodynamics can be maintained.

SUMMARY OF THE INVENTION

The present invention provides an improvement over the prior art by providing a system that may be used with either a full sized spare tire or temporary spare tire and in each instance provide a smooth, consistent, aerodynamic surface beneath the spare tire when it is held beneath a vehicle.

In accordance with the present invention, an aerodynamic spare tire cover system for use with a spare tire stored on a vehicle underbody includes an annular spare tire cover defining a central aperture. The cover system also includes a removable center cap for selectively covering the central aperture and an adjustable center spacer supported by the annular spare tire cover. The cover system further includes removable peripheral spacers supported by the annular spare tire cover. When using the cover system of the present invention, a full sized spare tire spaces the annular spare tire cover generally the same distance from a base of a spare tire storage well as a combination of a temporary spare tire and center spacer. The peripheral spacers provide additional stability and consistent spacing between the annular cover and the temporary spare. As a result, no matter which type of spare tire is stored, the annular spare tire cover and center cap remain generally flush with the surrounding underbody of the vehicle at the crest of the spare tire well.

These and other aspects of the invention are herein described in particularized detail with reference to the accompanying figures.

DETAILED DESCRIPTION OF THE INVENTION

Figure 1:
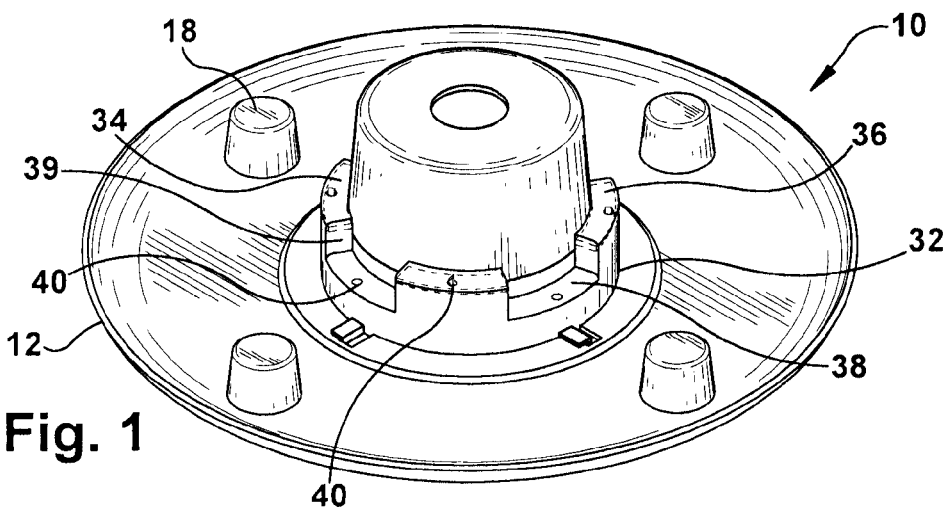
FIG. 1 is a perspective view of the spare tire cover system.

Referring to the drawings, a spare tire cover system 10 according to the present invention is illustrated. The spare tire cover system 10 includes an annular spare tire cover 12, a center cap 14, an adjustable center spacer 16 and peripheral spacers 18. The term spare tire is used throughout and refers to a known wheel and tire combination.

Figure 2:
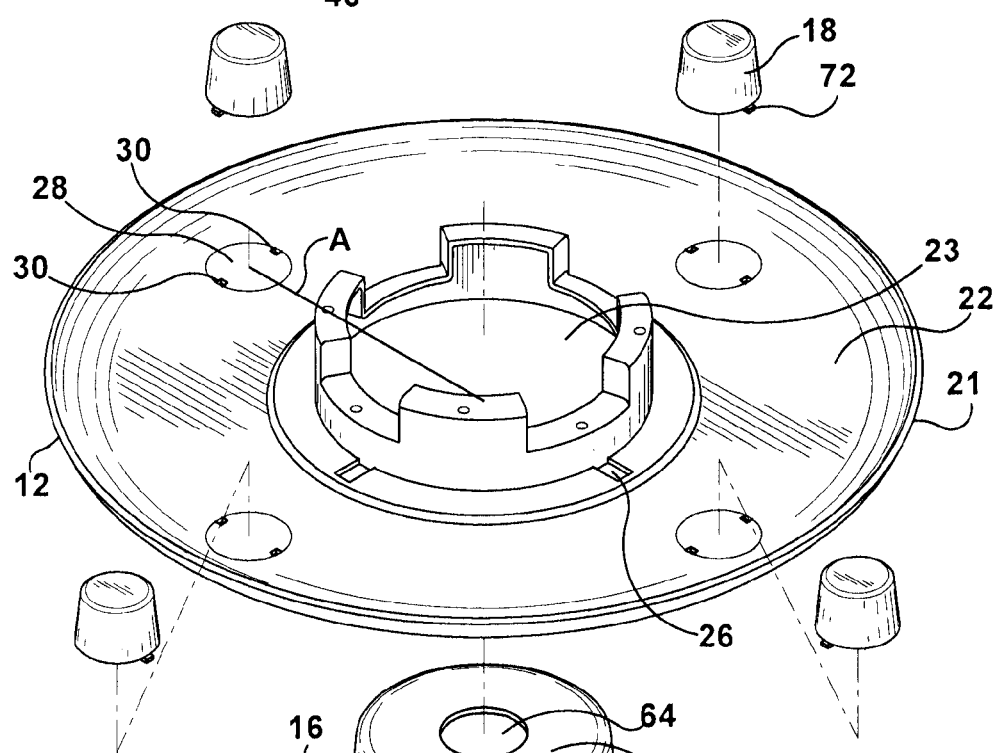
FIG. 2 is an exploded view of the spare tire cover system.
Figure 3:
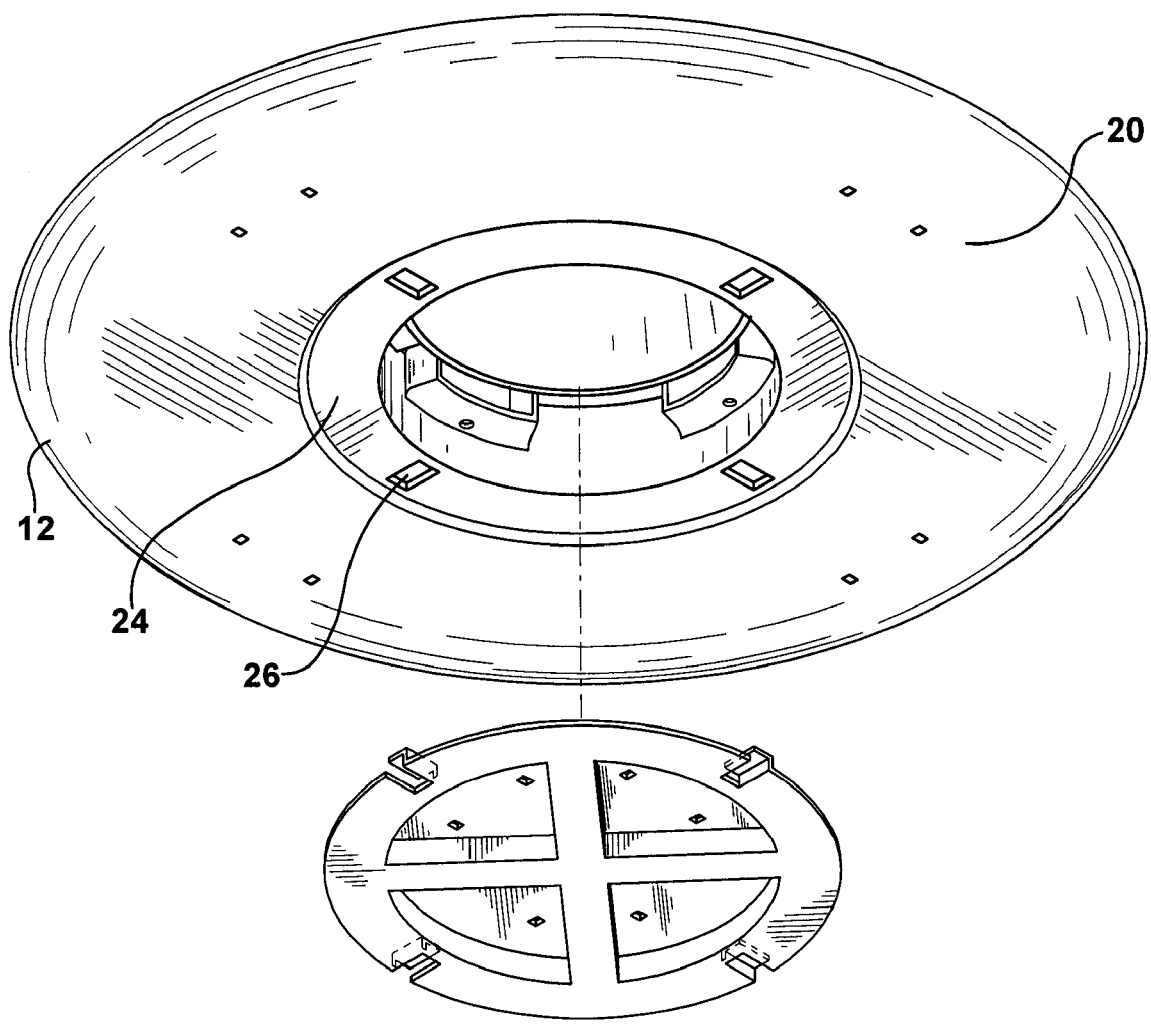
FIG. 3 is a perspective view of the spare tire cover system with the center cap removed.

Referring to FIGS. 1-3, the spare tire cover system 10 is shown completely detached from a spare tire. The annular spare tire cover 12 defines a first generally flat surface 20 and an opposite, second generally flat surface 22. A peripheral edge 21 of the annular spare tire cover 12 is curled in the direction of the second generally flat surface 22. The annular spare tire cover 12 also defines a central aperture 23. A seat 24 is disposed around the central aperture 23 and is countersunk with respect to the first generally flat surface 20. Four slots 26 are defined by the seat 24.

The second generally flat surface 22 defines four circular support areas 28 configured along a circle having a radius "A". Two slots 30 are provided along a circumference of each circular support area 28. A bi-level circular wall 32 protrudes from the second flat surface 22 directly adjacent to the central aperture 23. The wall 32 includes a stepped top edge 34 alternating between first and second heights. Flat steps 36 and 38 extend from the top edge 34 of the wall toward the center of the annular spare tire cover 12. Preferably, there are four upper steps 36 at the first height of the stepped top edge 34 and four lower steps 38 at the second height of the stepped top edge 34. Within each step 36 and 38, a top surface defines a small aperture 40. Risers 39 extend vertically from both ends of each lower step 38 upward to an adjacent upper step 36. No wall is provided beneath each step 36 and 38 on a side opposite the wall 32. The area under each upper step 36 and each lower step 38 is hollow.

The center cap 14 is provided with an outer flange 50 and a stepped inner surface 52. The outer flange 50 is annular and defines four tabs 54. The inner surface 52 is divided into quadrants 56 by channels 58 each having a bottom that is level with the outer flange 50. Each quadrant 56 of the inner surface 52 defines a circular support area 57, including slots 59, that is sized the same as the support areas 28 on the annular cover 12. Each tab 54 includes a vertical wall 53 and a horizontal wall 55 that extends in a cantilever manner from a top of the vertical wall 53. A void is provided in the outer flange 50 below each horizontal wall 53.

The adjustable center spacer 16 is shaped like a truncated cone and includes a side surface 63 and a top surface 62. A base end 61 of the side surface 63 is located opposite an end that meets the top surface 62. Four wing portions 60 of the center spacer 16 extend radially outward from the side surface 63 at the base end 61. Each wing portion 60 includes a lockable clip 66 that points toward the top surface 62 of the center spacer 16. The top surface 62 is flat and defines a central aperture 64.

The peripheral spacers 18 preferably are four posts that are selectively attachable to the secondary surface 22 of the annular cover 12 each at a support area 28. Each spacer 18 includes two tabs 72 at its bottom. The height of each spacer 18 is preferably equal to the difference between the first and second heights of the bi-level wall 34.

The spare tire cover 12, center cap 14, adjustable center spacer 16 and peripheral spacers 18 are all preferably made from fiberglass filled polypropylene, but may be made from other materials as well, such as nylon, other homogeneous polymers or reinforced polymers.

Figure 5:
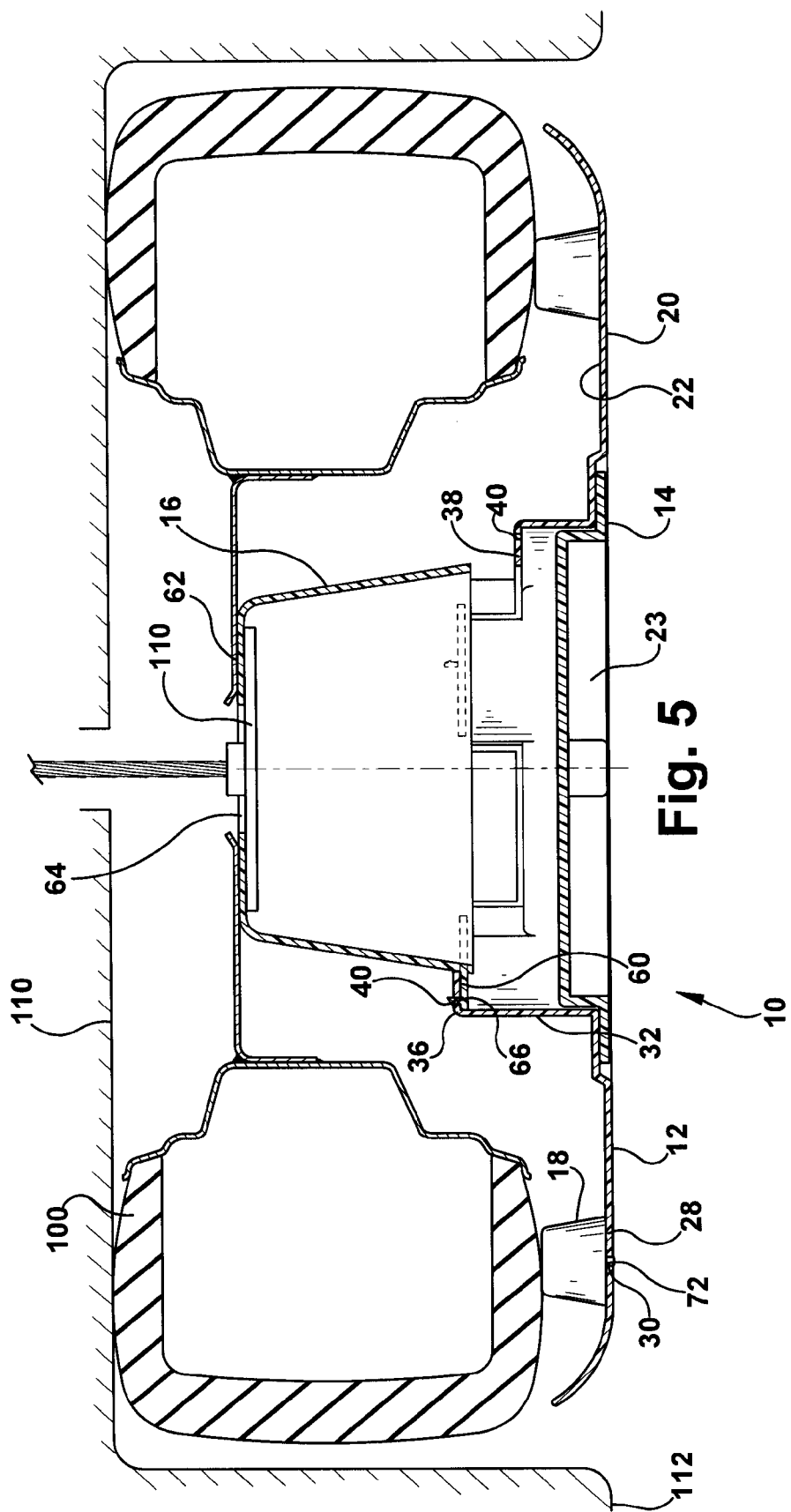
FIG. 5 is a close-up side elevational view of a vehicle including a temporary spare tire and the spare tire cover system.
Figure 6:
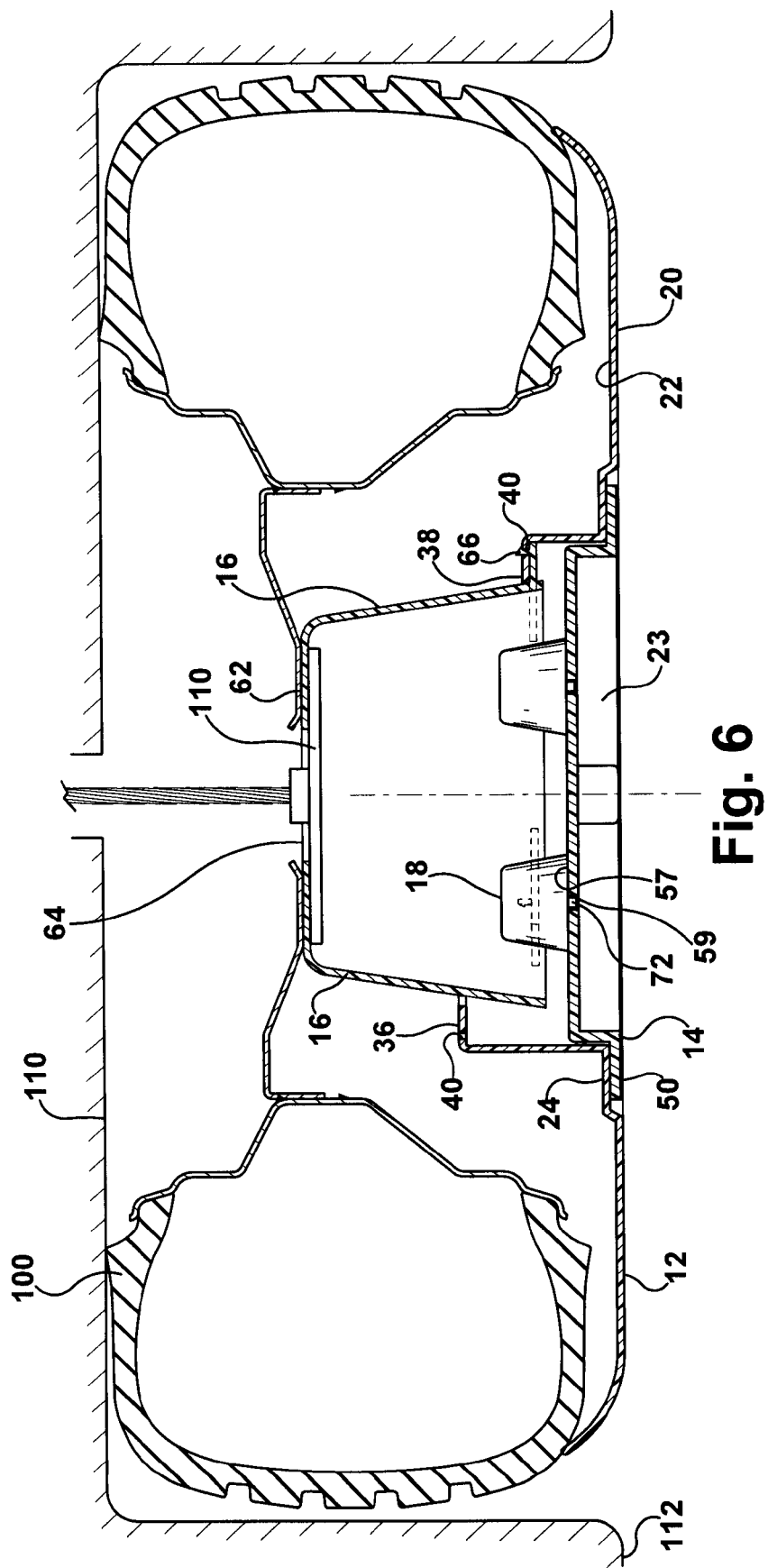
FIG. 6 is a close-up side elevational view of a vehicle including a full sized spare tire and the spare tire cover system.

Referring to FIGS. 5-6, assembly of the spare tire cover system 10 is shown. The center spacer 16 is attachable to the annular cover 12 in two distinct, alternate configurations. In a first configuration shown in FIG. 5, the top surface 62 of the center spacer 16 is placed through the central aperture 23 of the annular cover 12 and advanced until the wing portions 60 of the center spacer 16 fit adjacent the bi-level circular wall 32 and against the upper steps 36 that extend from the wall 32. As a result, the top surface 62 rises to a first height above the flat surface 22 of the annular cover 12. The lockable clips 66 on the wing portions 60 engage the small apertures 40 in the upper steps 36 by means of a snap fit.

Referring to FIG. 6, the center spacer 16 is changed to a second configuration after pressing down on the top surface 62 to unsnap the lockable clips 66 from the apertures 40 in the upper steps 36. The center spacer 16 is rotated until the wing portions 60 align with the lower steps 38 and the spacer 16 is again moved upward until the lockable clips 66 engage the holes 40 in the lower steps 38 by means of a snap fit. The top surface 62 is at a second, lower, height above the flat surface 22 as compared to the first configuration.

The center cap 14 is then secured to the annular cover 12. The center cap 14 is placed over the central aperture 23, the outer flange 50 fitting against the seat 24. The center cap 14 is rotated until the tabs 54 on the center cap 14 engage the slots 26 in the seat 24 of the annular cover 12. To remove the center cap 14, the center cap 14 is simply rotated in an opposite direction.

The peripheral spacers 18 are configurable in two positions, the first being a functional position and the second a storage position. Referring to FIG. 5, the peripheral spacers 18 are placed on the support areas 28 of the annular cover 12, representing a functional position. The tabs 72 on the individual spacers 18 engage the slots 30 in the annular cover support areas 28. Referring to FIG. 6, the peripheral spacers 18 are removed from the support areas 28 in the annular cover 12 and placed on the support areas 57 of the center cap 14, representing a storage position. The tabs 72 on the individual spacers 18 engage the slots 59 of the support area 57. When in the storage position, the spacers 18 do not contact the spare tire when the cover system is in use.

Figure 4:
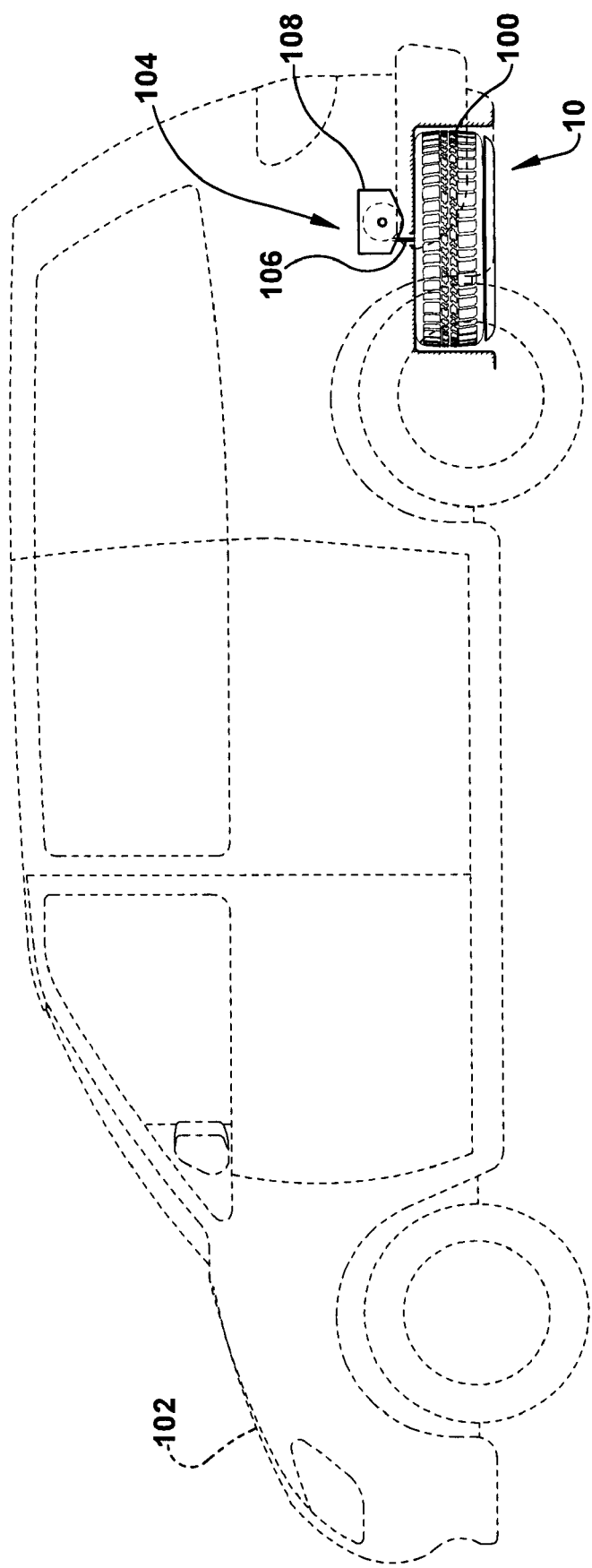
FIG. 4 is a side elevational view of a vehicle including a full sized spare tire and the spare tire cover system.

Referring to FIGS. 4-6, the cover system 10 is used to provide an aerodynamically smooth surface that covers the spare tire 100 on the underside of a vehicle 102. The spare tire 100 is typically held under the vehicle using a hoist 104. The hoist 104 is of a type well known in the art and includes a cord or chain 106, a retractor 108 and a stop 110. The retractor 108 is attached to the body of the vehicle 102. The cord 106 extends from the retractor 108 and passes through a hole within the center of the spare tire 100 and through the central aperture 64 in the center spacer 16. The stop 110 abuts the center spacer 16 on a side opposite the top surface 62 and pulls the top surface 62 against the spare tire 100, thus, holding both the spare tire 100 and cover system 10 in place. By putting the center cap 14 in place, the stop 110 is hidden from view.

Through the use of the center spacer 16 and peripheral spacers 18, the distance between a base of a spare tire well 110 of the vehicle 102 and the annular cover 12 is generally consistent no matter whether a full sized spare tire 100 or temporary spare tire 101 is stored. As a result, the annular cover 12 and center cap 14 are consistently generally flush with a lower surface 112 of the underbody of the vehicle 102 at the crest of the spare tire well.

Figure 7:
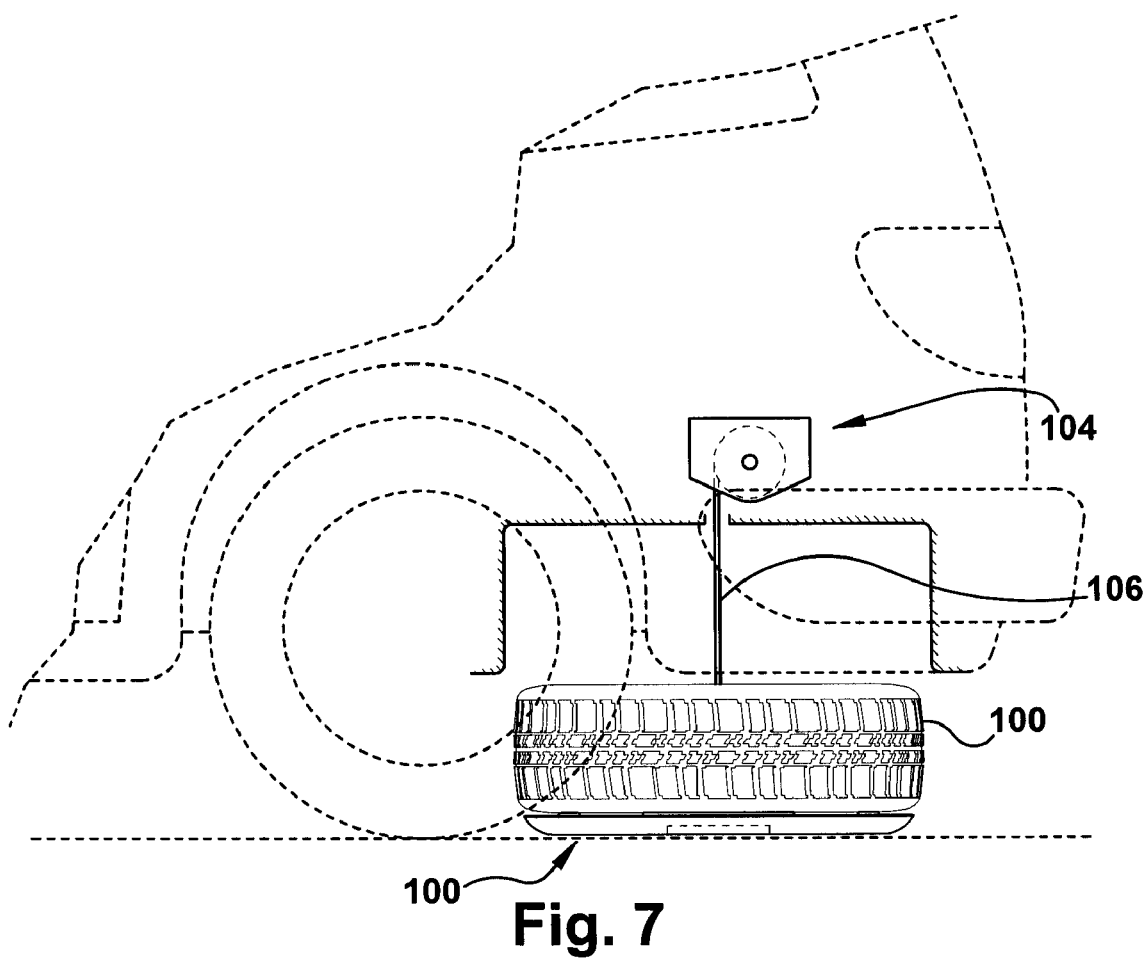
FIG. 7 is a side elevational view of a vehicle including a full sized spare tire that is partially removed.

Referring to FIG. 7, to remove the spare tire 100 for use, the hoist 104 is actuated to lower the spare tire 100 and cover system 10. The center cap 14 is also removed from the cover system 10, either before or actuating the hoist 104. After the spare tire 100 has been lowered, there is sufficient slack in the cord 106 of the hoist to allow the stop 110 to be detached from the cord 106 or fit through the aperture 64 on the center spacer 16 and the hole in the spare tire 100. The annular cover 12 and center spacer 16 are put aside and the spare tire 100 is then ready to be used.

Other types of fasteners known in the art may be used to hold the adjustable spacer to the annular cover and the center cap to the annular cover.

The cover system is a simple device that provides a consistent aerodynamic surface on the underside of a vehicle no matter what type of spare tire is stored there. The combination of the annular cover and center cap create a generally flat surface that is generally flush with a lower surface of the vehicle underbody, thus providing superior underbody aerodynamics. The spacing elements (center and peripheral) are stored with the cover system at all times and never have to be recovered for use from some other storage location. The shape of the center spacer allows for the center spacer to be easily fit into the annular cover. The cover system may be used on vehicle that does not include a well for storing the spare tire because significant aerodynamic advantages are still provided by having a flat surface covering at least the bottom of the spare tire. The cover system is preferably stored inside of the vehicle when no spare tire is stored on the underside of the vehicle, for example when the spare tire is being repaired.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. An aerodynamic spare tire cover system for use on a spare tire and wheel combination stored on a vehicle underbody, the system comprising:
    an annular spare tire cover having a diameter sufficient to cover at least a portion of both the tire and wheel in a spare tire and wheel combination, and defining a central aperture;
    a removable center cap for selectively covering the central aperture of the annular spare tire cover;
    a center spacer selectively adjustable between a first position and a different second position with respect to the spare tire cover, where in each position the center spacer is supported by the spare tire cover; and a plurality of removable peripheral spacers supported by the annular spare tire cover, wherein the center spacer, when supported in the first position in the spare tire cover, cooperates with a full sized spare tire to space the spare tire cover a first distance from a first portion of the underbody of the vehicle, and wherein the center spacer, when supported in the second position in the spare tire cover, cooperates with a temporary spare tire to space the spare tire cover a second distance, generally equivalent to the first distance, from the first portion of the underbody of the vehicle.

2. The aerodynamic spare tire cover system of claim 1, wherein the removable center cap provides planar storage surfaces, including slots that engage tabs on the peripheral spacers, for the peripheral spacers when the peripheral spacers are not used to space the spare tire cover from the spare tire.

3. The aerodynamic spare tire cover system of claim 1, wherein the removable center cap further comprises a plurality of tabs that selectively interlock with a plurality of slots on the annular spare tire cover.

4. The aerodynamic spare tire cover system of claim 1, wherein when the center spacer is in either the first position or the second position, the annular spare tire cover is generally flush with a second portion of the vehicle underbody.

5. The aerodynamic spare tire cover system of claim 1, wherein the first portion of the vehicle underbody is the base of a spare tire well.

6. The aerodynamic spare tire cover system of claim 1, wherein:

the annular spare tire cover includes:
a bi-level circular wall;
a plurality of first steps extending from the circular wall toward a center of the spare tire cover at a first height; and
a plurality of second steps extending from the circular wall toward a center of the spare tire cover at a second height; and the adjustable center spacer includes a plurality of wing portions that selectively fit either against the first steps when the center spacer is in the first position or against the second steps when the center spacer is in the second position.

7. The aerodynamic spare tire cover system of claim 1, wherein the center spacer has a truncated cone shape.

8. The aerodynamic spare tire cover system of claim 6, wherein the wing portions extend outwardly from a base of the center spacer.

9. The aerodynamic space tire cover system of claim 1, wherein the spacers are posts having a truncated cone shape.

10. The aerodynamic spare tire cover system of claim 1, wherein the center cap is generally flush with the spare tire cover when the center cap covers the central aperture of the spare tire cover.

11. The aerodynamic spare tire cover system of claim 6, wherein the center spacer and center cap are separate elements.

12. The aerodynamic spare tire cover system of claim 6, wherein the plurality of removable peripheral spacers are supported on the annular spare tire cover in a position between the central aperture and an outer edge of the annular spare tire cover.

13. The aerodynamic spare tire cover system of claim 6, wherein the spare tire cover is generally planar between the central aperture and a peripheral concave edge portion.

14. The aerodynamic spare tire cover system of claim 6, wherein the largest diameter of the center spacer is less than the diameter of the center cap and largest diameter of the spare tire cover.

15. An aerodynamic spare tire cover system for use on a spare tire stored on a vehicle underbody, the system comprising:

an annular spare tire cover defining a central aperture;
a removable center cap for selectively covering the central aperture of the annular spare tire cover;
a center spacer selectively adjustable between a first position and a different second position with respect to the spare tire cover, where in each position the center spacer is supported by the spare tire cover; and
a plurality of removable peripheral spacers supported by the annular spare tire cover,
wherein the center spacer, when supported in the first position in the spare tire cover, cooperates with a full sized spare tire to space the spare tire cover a first distance from a first portion of the underbody of the vehicle, and wherein the center spacer, when supported in the second position in the spare tire cover, cooperates with a temporary spare tire to space the spare tire cover a second distance, generally equivalent to the first distance, from the first portion of the underbody of the vehicle
wherein:
the annular spare tire cover includes:
a bi-level circular wall;
a plurality of first steps extending from the circular wall toward a center of the spare tire cover at a first height; and
a plurality of second steps extending from the circular wall toward a center of the spare tire cover at a second height; and
the adjustable center spacer includes a plurality of wing portions that selectively fit either against the first steps when the center spacer is in the first position or against the second steps when the center spacer is in the second position.

* * * * *